United States Patent
Norris et al.

(10) Patent No.: US 9,071,988 B2
(45) Date of Patent: Jun. 30, 2015

(54) APPARATUS, COMPUTER PROGRAM PRODUCT, AND METHODS FOR FLEXIBLE DATA UNIT SEGMENTATION AND ARRANGEMENT

(75) Inventors: Timothy Norris, Winchester (GB); Michael Whitehead, Farnham (GB); Luis Miguel Santos Barreto, Camberley (GB)

(73) Assignee: Core Wireless Licensing S.a.r.l, Luxembourg (LU)

( * ) Notice: Subject to any disclaimer, the term of this patent is extended or adjusted under 35 U.S.C. 154(b) by 1122 days.

(21) Appl. No.: 12/531,393

(22) PCT Filed: Mar. 14, 2008

(86) PCT No.: PCT/IB2008/050977
§ 371 (c)(1),
(2), (4) Date: Nov. 10, 2009

(87) PCT Pub. No.: WO2008/111019
PCT Pub. Date: Sep. 18, 2008

(65) Prior Publication Data
US 2010/0111106 A1    May 6, 2010

Related U.S. Application Data

(60) Provisional application No. 60/918,351, filed on Mar. 15, 2007.

(51) Int. Cl.
*H04J 3/24* (2006.01)
*H04W 28/06* (2009.01)
(Continued)

(52) U.S. Cl.
CPC .............. *H04W 28/06* (2013.01); *H04L 69/02* (2013.01); *H04L 69/03* (2013.01); *H04L 69/324* (2013.01)

(58) Field of Classification Search
None
See application file for complete search history.

(56) References Cited

U.S. PATENT DOCUMENTS 7,289,535 B2 * 10/2007 Odman .................. 370/473
2005/0213605 A1    9/2005 Kim et al.
(Continued)

FOREIGN PATENT DOCUMENTS

WO    2006039594 A    4/2006

OTHER PUBLICATIONS

3GPP TS 25.321 V6.9.0 (Jun. 2006) Technical Specification 3rd Generation Partnership Project; Technical Specification Group Radio Access Network; Medium Access Control (MAC) protocol specification (Release 6), Section 9.1.4 and section 9.2.2.

(Continued)

*Primary Examiner* — Rhonda Murphy
(74) *Attorney, Agent, or Firm* — Core Wireless Licensing Ltd.

(57) ABSTRACT

Apparatus, computer program products and methods allow inclusion and segmentation of multiple SDUs within a PDU, and generate information (such as header information) necessary to identify, e.g., the position of the segmented SDUs within the PDU. Prior knowledge of the typically used (i.e., predetermined) SDU size is used to perform segmentation operations, hi one exemplary variant, apparatus, methods and computer program products determine if a particular one of a set of input data units (SDUs) is to be segmented in order to fit a portion of the set, including a segment of the particular input data unit, into an output data unit (PDU); segment the input data unit in response to determining the particular input data unit is to be segmented; add the portion of the set to a data portion of the output data unit, and add into the output data unit an indication of a position of the segment in the data portion. In another variant, apparatus, computer program products and methods receive first data units, each of the first data units including a plurality of data portions having a plurality of second data units, each of at least two of the first data units including an indication of a position of a segment of a second data unit in associated ones of the data portions; combine using at least the indications the segments to create a complete second data unit; and output the complete second data unit.

10 Claims, 9 Drawing Sheets

(51) Int. Cl.
*H04L 29/06* (2006.01)
*H04L 29/08* (2006.01)

(56) References Cited

U.S. PATENT DOCUMENTS

2007/0060139 A1* 3/2007 Kim et al. .................. 455/445
2010/0014446 A1* 1/2010 Chun et al. .................. 370/310

OTHER PUBLICATIONS

International Search Report and Written Opinion of the International Searching Authority for PCT Application No. PCT/IB2008/050977, dated Sep. 1, 2008, 13 pages.
"Universal Mobile Telecommunications Systems (UMTS); Medium Access Control (MAC) Protocol Specification (3GPP TS 25.321 version 7.3.0 Release 7); ETSI TS 125 321" ETSI Standards, Lis, Sophia Antipolis Cedex, France, vol. 3-R2, No. V7.3.0, pp. 76, 78-80, Dec. 2006.
3GPP: "3GPP TS 25.322, V7.2.0 (Sep. 2006) 3rd Generation Partnership Project; Technical Specification Group Radio Access Network; Radio Link Control (RLC) protocol specification (Release 7)" Sep. 2006, p. 1, 2, 10-63.
3GPP: "3GPP TS 25.321, V7.7.0 (Dec. 2007) 3rd Generation Partnership Project; Technical Specification Group Radio Access Network; Medium Access Control (MAC) protocol Specification (Release 7)" Dec. 2007, p. 1, 2, 41-77.
Ericsson et al., "CR 0318—Introduction of Improved L2 Support for High Data Rates and Enhanced Cell-Fach state", 3GPP TSG-RAN WG2#58, May 7, 2007.
Samsung et al., "R2-073834—Defining of Reordering SDU and Correction to the Definition of the SI field", CR 0351, 3GPP TSG RAN WG2#59, Aug. 20, 2007.

* cited by examiner

APPARATUS, COMPUTER PROGRAM PRODUCT, AND METHODS FOR FLEXIBLE DATA UNIT SEGMENTATION AND ARRANGEMENT

RELATED APPLICATION

This application was originally filed as PCT Application No. PCT/IB2008/050977 filed Mar. 14, 2008 and claims priority to U.S. Provisional Application No. 60/918,351 filed Mar. 15, 2007.

TECHNICAL FIELD

The exemplary and non-limiting embodiments of this invention relate generally to wireless communications systems and, more specifically, relate to segmentation and arrangement of data for transmission and reception.

BACKGROUND

Cellular radio systems may involve a layered protocol where one layer needs to include large SDUs (service data units), which arrive as inputs from a different layer, within its own output PDUs (protocol data units). One example of this is within HSDPA (high speed uplink packet access) in UMTS (universal mobile telecommunications system) where multiple MAC (medium access control) SDUs are included within a MAC PDU.

When including SDUs that are very large or that are larger than the current PDU size, it is necessary to segment these SDUs to allow them to fit across multiple PDUs, and avoid excessive padding. The existing method within 3GPP for indicating the inclusion of multiple SDUs is not very flexible when considering, for instance, the information required within the PDU to indicate the size of each of the SDUs. 3GPP (third generation partnership project) TS (technical standard) 25.321, v. 6.9.0 (2006 June) sections 9.1.4 and 9.2.2 illustrate current techniques for inclusion of SDUs within the MAC PDU.

Thus those skilled in the art seek apparatus, methods and computer program products that overcome the limitations of the prior art.

SUMMARY OF THE INVENTION

An embodiment of the invention is a method comprising: determining if a particular one of a set of input data units is to be segmented in order to fit a portion of the set, including a segment of the particular input data unit, into an output data unit; segmenting the input data unit in response to determining the particular input data unit is to be segmented; adding the portion of the set to a data portion of the output data unit; and adding into the output data unit an indication of a position of the segment in the data portion.

Another embodiment of the invention is an apparatus comprising: at least one processor configured to determine if a particular one of a set of input data units is to be segmented in order to fit a portion of the set, including a segment of the particular input data unit, into an output data unit; to segment the input data unit in response to determining the particular input data unit is to be segmented; to add the portion of the set to a data portion of the output data unit; and to add into the output data unit an indication of a position of the segment in the data portion.

A further embodiment of the invention is a method comprising: creating, from a set of input data units, data portions that contain either one segment of a data unit or one atypically sized data unit, where the atypically sized data unit has a length that is different from a predetermined length; creating complete output data units from the data portions; and providing indications in the output data units as to which one of a segment or an atypically sized data unit is contained within associated ones of the data portions.

Yet another embodiment of the invention is an apparatus comprising: at least one processor configured to create, from a set of input data units, data portions that contain either one segment of a data unit or one atypically sized data unit, where the atypically sized data unit has a length that is different from a predetermined length; to create complete output data units from the data portions, and to provide indications in the output data units as to which one of a segment or an atypically sized data unit is contained within associated ones of the data portions.

A still further embodiment of the invention is a method comprising: receiving first data units, each of the first data units including a plurality of data portions having a plurality of second data units, each of at least two of the first data units including an indication of a position of a segment of a second data unit in associated ones of the data portions; combining using at least the indications the segments to create a complete second data unit; and outputting the complete second data unit.

Another embodiment of the invention is an apparatus comprising at least one processor configured to receive first data units, each of the first data units including a plurality of data portions having a plurality of second data units, each of at least two of the first data units including an indication of a position of a segment of a second data unit in associated ones of the data portions; to combine using at least the indications the segments to create a complete second data unit; and to output the complete second data unit.

A further embodiment of the invention is a method comprising: receiving first data units including data portions and indications as to which one of a segment of a second data unit or an atypically sized second data unit is contained within associated ones of the data portions, the data portions including a plurality of second data units, where the atypically sized second data unit has a length that is different from a predetermined length, and determining, based at least in part on the indications, the predetermined length, and the data portions, output data units that correspond to the second data units.

Yet another embodiment of the invention is an apparatus comprising at least one processor configured to receive first data units including data portions and indications as to which one of a segment of a second data unit or an atypically sized second data unit is contained within associated ones of the data portions, the data portions including a plurality of second data units, where the atypically sized second data unit has a length that is different from a predetermined length, and the at least one processor is further configured to determine, based at least in part on the indications, the predetermined length, and the data portions, output data units that correspond to the second data units.

A still further embodiment of the invention is a method comprising: determining a location of a particular one of a set of input data units, the set of input data units having an original order; placing the particular input data unit and a plurality of data units from the set in an output data unit, wherein the placing occurs so that the particular input data unit is placed in a particular location of the output data unit and is placed out-of-order relative to the original order; and communicating the output data unit.

Another embodiment of the invention is a method comprising: receiving a first data unit including a plurality of second data units, where a particular one of the plurality of second data units is situated at a predetermined location in the first data unit and wherein the plurality of second data units had an original order and the predetermined location of the particular second data unit places the particular second data unit out-of-order relative to the original order; extracting the plurality of second data units; rearranging the particular second data unit and the others of the plurality of second data units into the original order; and communicating the rearranged plurality of second data units.

A further embodiment of the invention is a device comprising: a processor configured to generate an output data unit which contains one or more data portions, wherein each data portion contains one or more typical input data units having a predetermined length and one atypical input unit which has a different length, the processor further configured to generate a header for the output data unit, wherein the header comprises only one length indicator for each data portion, and wherein the only one length indicator can be used to calculate the number of typical input data units and the length of the atypical input data unit, and a transmitter to transmit the output data unit to a receiver.

Yet another embodiment of the invention is method comprising: generating an output data unit which contains one or more data portions, wherein each data portion contains one or more typical input data units having a predetermined length and one atypical input unit which has a different length; generating a header for the output data unit, wherein the header comprises only one length indicator for each data portion, and wherein the only one length indicator can be used to calculate the number of typical input data units and the length of the atypical input data unit, and transmitting the output data unit to a receiver.

A still further embodiment of the invention is a device comprising: a receiver configured to receive an output data unit, the output data unit containing one or more data portions, wherein each data portion contains one or more typical input data units having a predetermined length and one atypical input unit which has a different length and where the output data portion further comprises a header, wherein the header comprises only one length indicator for each data portion, and wherein the only one length indicator can be used to calculate the number of typical input data units and the length of the atypical input data unit; and a processor configured to calculate the number of the of typical input data units and the length of the atypical input data unit using the header.

BRIEF DESCRIPTION OF THE DRAWINGS

Embodiments of this invention are made more evident in the following Detailed Description of Exemplary Embodiments, when read in conjunction with the attached Drawing Figures, wherein:

FIG. 3, including

DETAILED DESCRIPTION OF EXEMPLARY EMBODIMENTS

In an exemplary embodiment, techniques are disclosed to allow inclusion and segmentation of multiple SDUs within a PDU, and to keep information (such as header information) necessary to identify, e.g., the position of the segmented SDUs to a minimum without sacrificing flexibility. This is performed in an exemplary embodiment by having prior knowledge of the typically used (i.e., predetermined) SDU size. As used herein, the SDU size is considered to be equivalent to a length of the SDU.

Figure 1:
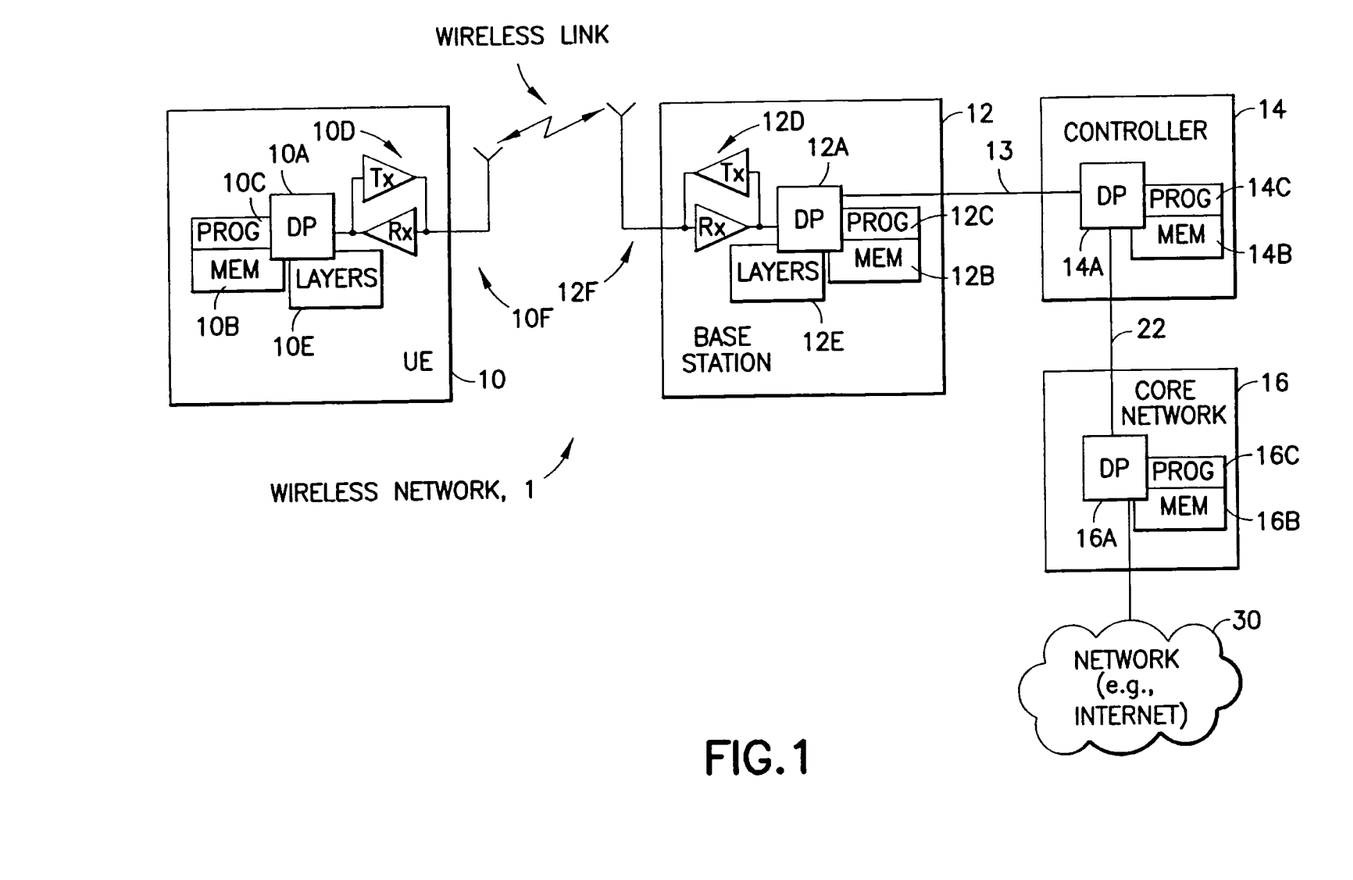
FIG. 1 is a simplified block diagram of an exemplary wireless network in which exemplary embodiments of the disclosed invention may be implemented.

Reference is made to FIG. 1 for illustrating a simplified block diagram of various electronic devices that are suitable for use in practicing the exemplary embodiments of this invention. In FIG. 1, a wireless network 1 includes a user equipment (UE) 10, a base station 12, a controller 14, and a core network 16. The core network 16 is coupled to a network 30, such as the Internet. The user equipment 10 includes a data processor (DP) 10A, a memory (MEM) 10B that stores a program (PROG) 10C, and a suitable radio frequency (RF) transceiver 10D (comprising at least one transmitter, Tx, and at least one receiver, Rx) for bidirectional wireless communications using at least one antenna 10F with the base station 12. The UE 10 also includes protocol layers 10E, which include communication layers.

The base station 12 includes a DP 12A, a MEM 12B that stores a PROG 12C, and a suitable RF transceiver 12D (comprising at least one transmitter, Tx, and at least one receiver, Rx) also coupled to at least one antenna 12F. The base station 12 also includes protocol layers 12E.

The base station 12 is coupled via a data path 13 to the controller 14 that also includes a DP 14A and a MEM 14B storing an associated PROG 14C. A data path 22 interconnects the controller 14 and the core network (CN) 16, which also includes a DP 16A, and MEM 16B that stores a PROG 16C.

For 3G and LTE, the base station 12 includes, for instance, a Node B or evolved Node B, the controller 14 includes, for example, a radio network controller (RNC) or MME (Mobility Management Entity), and the core network 14 includes, e.g., a mobile servicing center/visitor location register, a signaling system seven, a home location register, and a serving GPRS (general packer radio system) support node. 3G typically implements the radio access technology of, e.g., CDMA (code division multiple access) multiplexing and quadrature phase shift keying and binary phase shift keying modulation schemes. However, some 3G systems implement radio access technologies including a combination of TDMA (time division multiple access), CDMA, FDMA (frequency division multiple access), and possibly also SDMA (space diversity multiple access) and may use other modulation schemes. LTE is expected to use OFDM (orthogonal frequency division multiplexed) based technologies.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Certain embodiments of this invention may be implemented by computer software executable by the DP 10A of the user equipment 10 and the other DPs, or by hardware, or by a combination of software and hardware. For instance, the layers 10E and 12E may be part of the PROGs 10C, 12C, which would then be executed by an associated DP 10A, 12A. As another example, the layers 10E, 12E could be completely implemented by a DP 10A, 12A, such as an application-specific integrated circuit. In other embodiments, the layers 10E, 12E could be implemented in part with software and in part with hardware. The MEMs 10B, 12B, 14B, and 16B may be of any type suitable to the local technical environment and may be implemented using any suitable data storage technology, such as semiconductor-based memory devices, flash memory, magnetic memory devices and systems, optical memory devices and systems, fixed memory, and removable memory. The DPs 10A, 12A, 14A, and 16A may be of any type suitable to the local technical environment, and may include one or more of general-purpose computers, special-purpose integrated circuits, microprocessors, digital signal processors (DSPs) and processors based on a multi-core processor architecture, as non-limiting examples. The MEMs 10B, 12B, 14B, and 16B may contain machine-readable instructions from a computer program product tangibly embodying a program of the machine-readable instructions, which are executable by at least one data processor 10C, 12C, 14C, or 16C to perform operations described herein. Such a computer program product may include a compact disk (CD), digital versatile disk (DVD), flash memory, memory stick, or any other product suitable for containing a program of machine-readable instructions.

Figure 2:
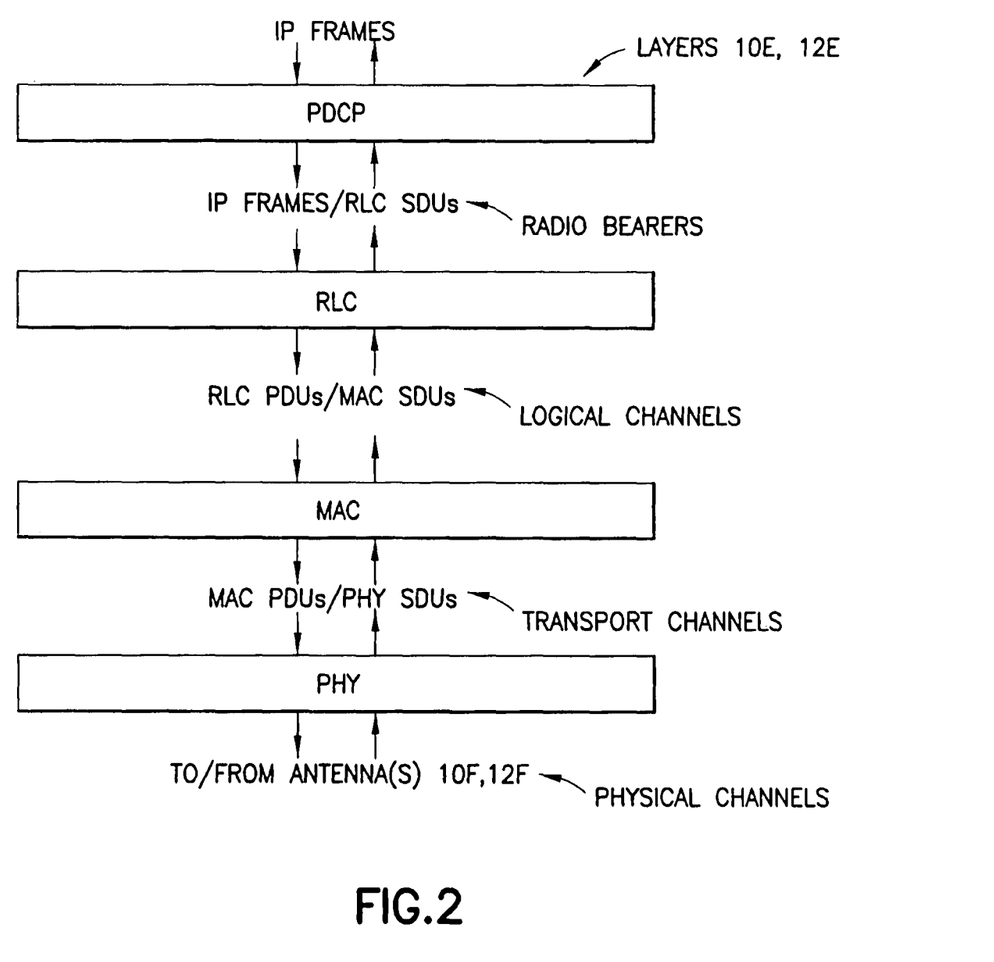
FIG. 2 is a simplified block diagram of a number of communication layers, the data that passes between the layers, and channels used between the layers.

FIG. 2 is a simplified block diagram of a number of communication layers and the data that passes between the layers. IP frames are given (e.g., by upper layer(s), not shown, such as an application) to a packet data convergence protocol (PDCP) layer. The PDCP layer is considered a Layer 3 entity. The PDCP layer typically forwards IP (Internet protocol) frames from the application, which are passed to the RLC (radio link control) layer as RLC SDUs. The RLC layer outputs RLC PDUs, which are MAC SDUs, by using one or more logical channels. The MAC layer receives the MAC SDUs and outputs MAC PDUs (PHY SDUs) using one or more transport channels. RLC and MAC are considered Layer 2 entities. The PHY layer is considered a Layer 1 entity and communicates (e.g., transmits or receives) the data over a number of physical channels, using one or more antennas 10F, 12F. It is noted that the layers shown in FIG. 2 are merely exemplary and different, additional, or fewer layers may be used.

The exemplary embodiments of this invention are concerned with the MAC layer and how RLC PDUs (i.e., MAC SDUs) can be segmented and put into MAC PDUs (and vice versa: how MAC SDUs can be determined from MAC PDUs). In an exemplary embodiment herein, the MAC-hs (high speed) is considered, although MAC-hs is merely exemplary. It is noted that additional information about MAC is described in 3GPP TS 25.321, v6.10.0 (2006 September).

Figure 3A:
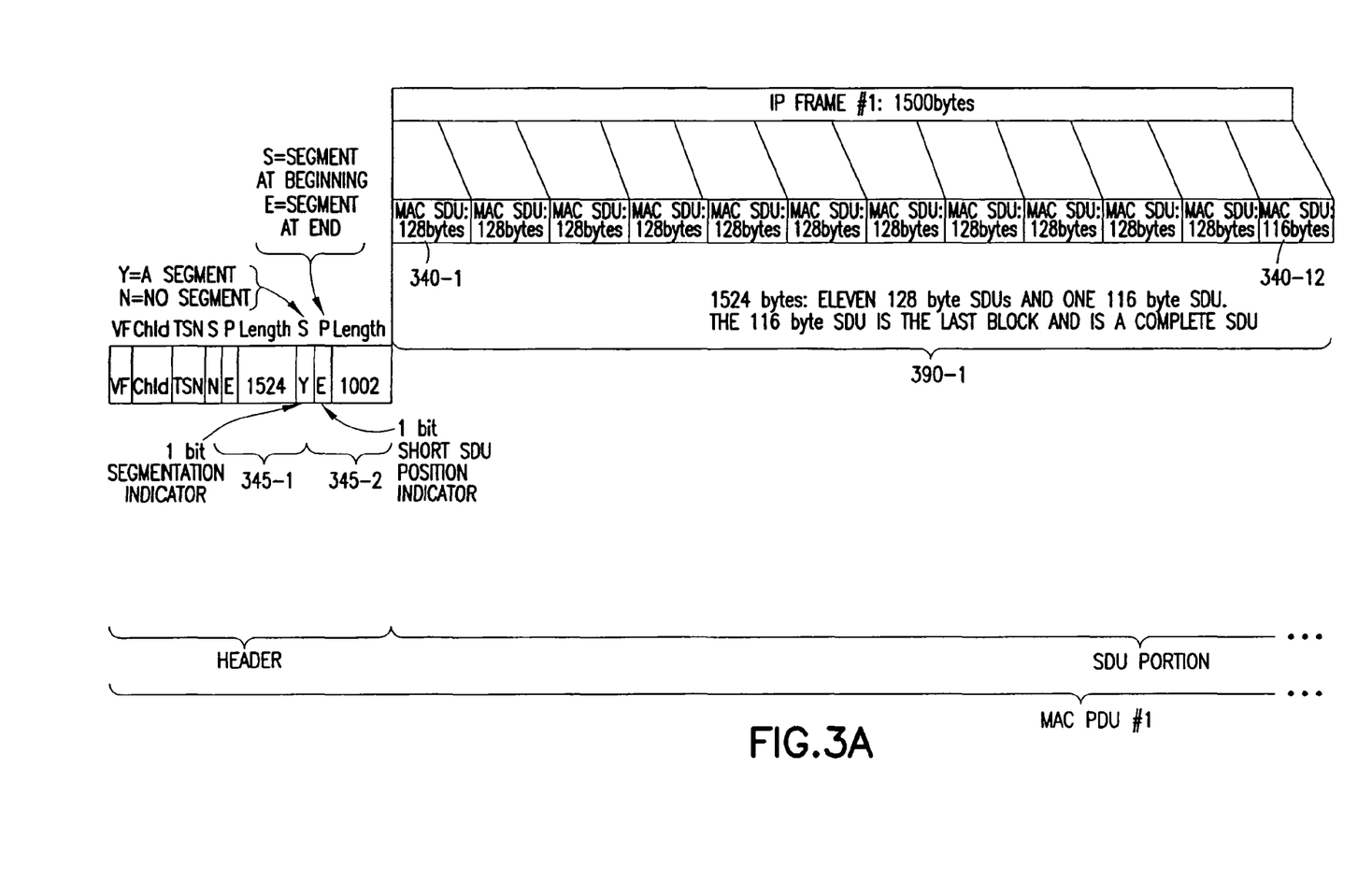
FIGS. 3A, 3B, and 3C, is a diagram illustrating an example of MAC PDUs, how MAC SDUs are segmented into portions placed into the MAC PDUs, and how the portions of the MAC SDUs are indicated.
Figure 3B:
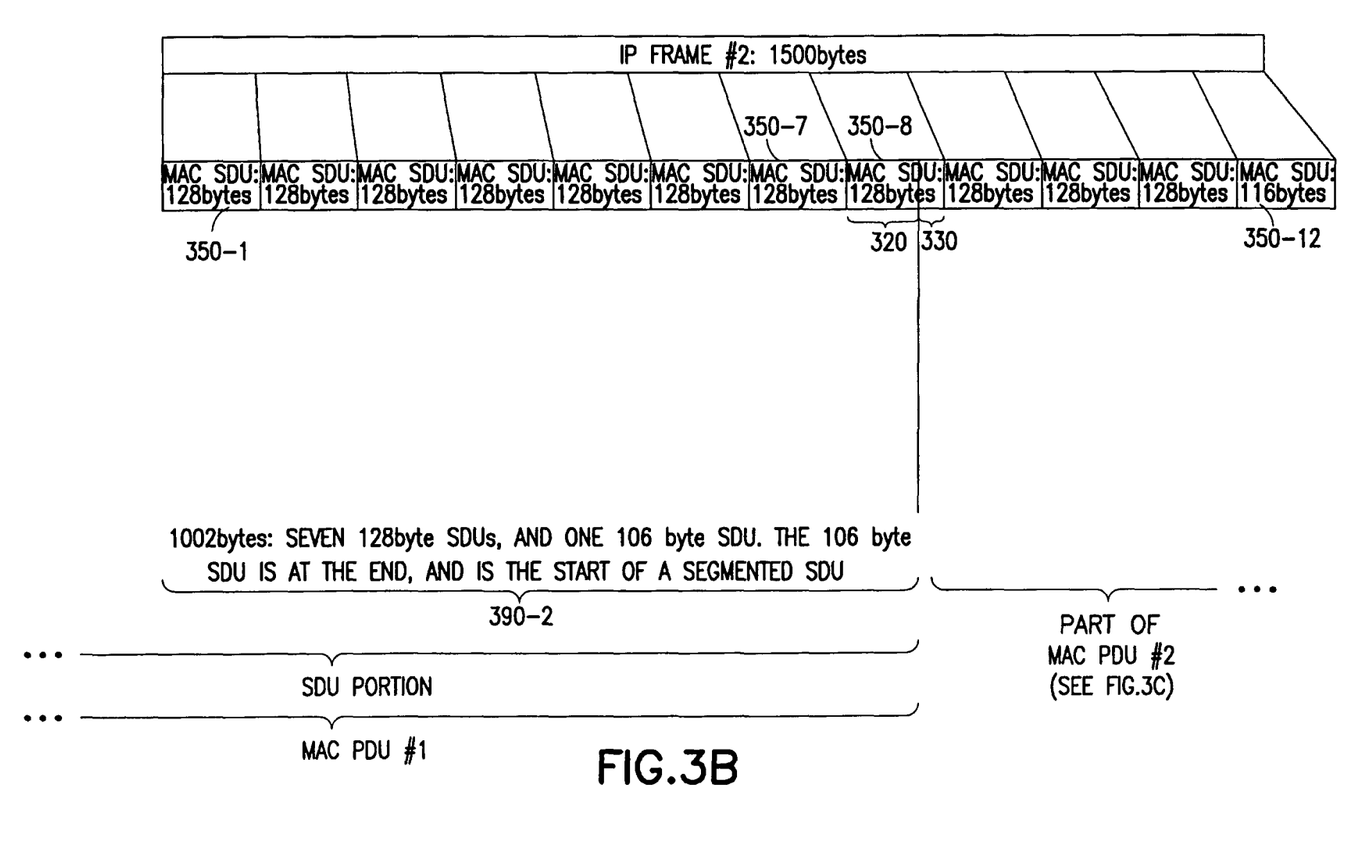
Figure 3C:
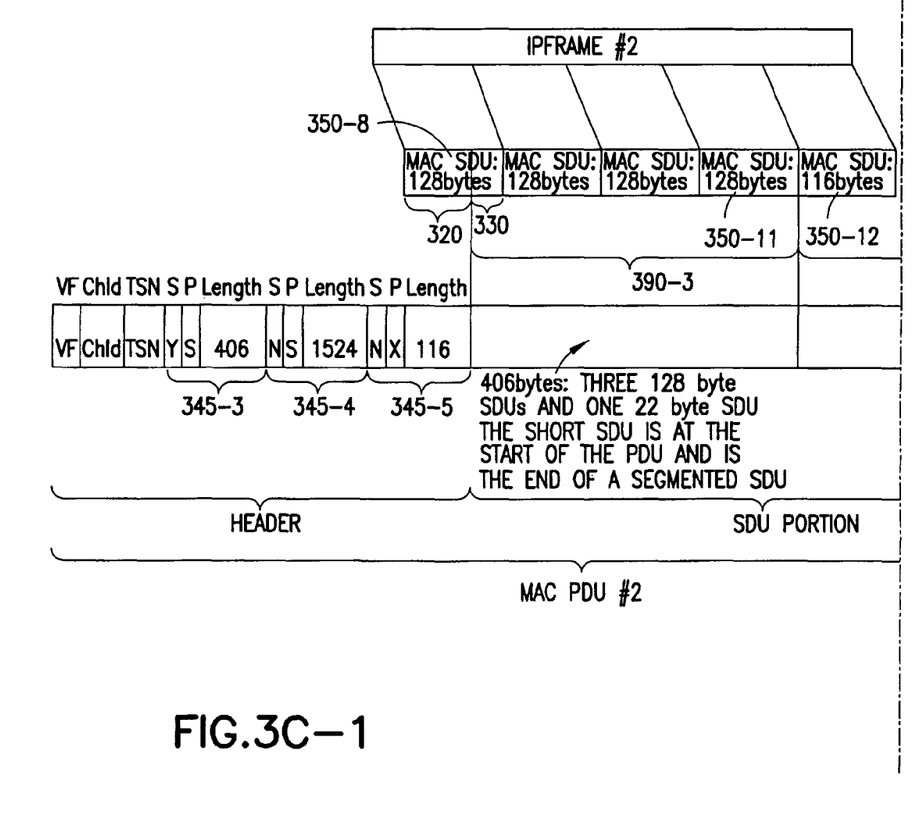
Figures 3C, 3C:
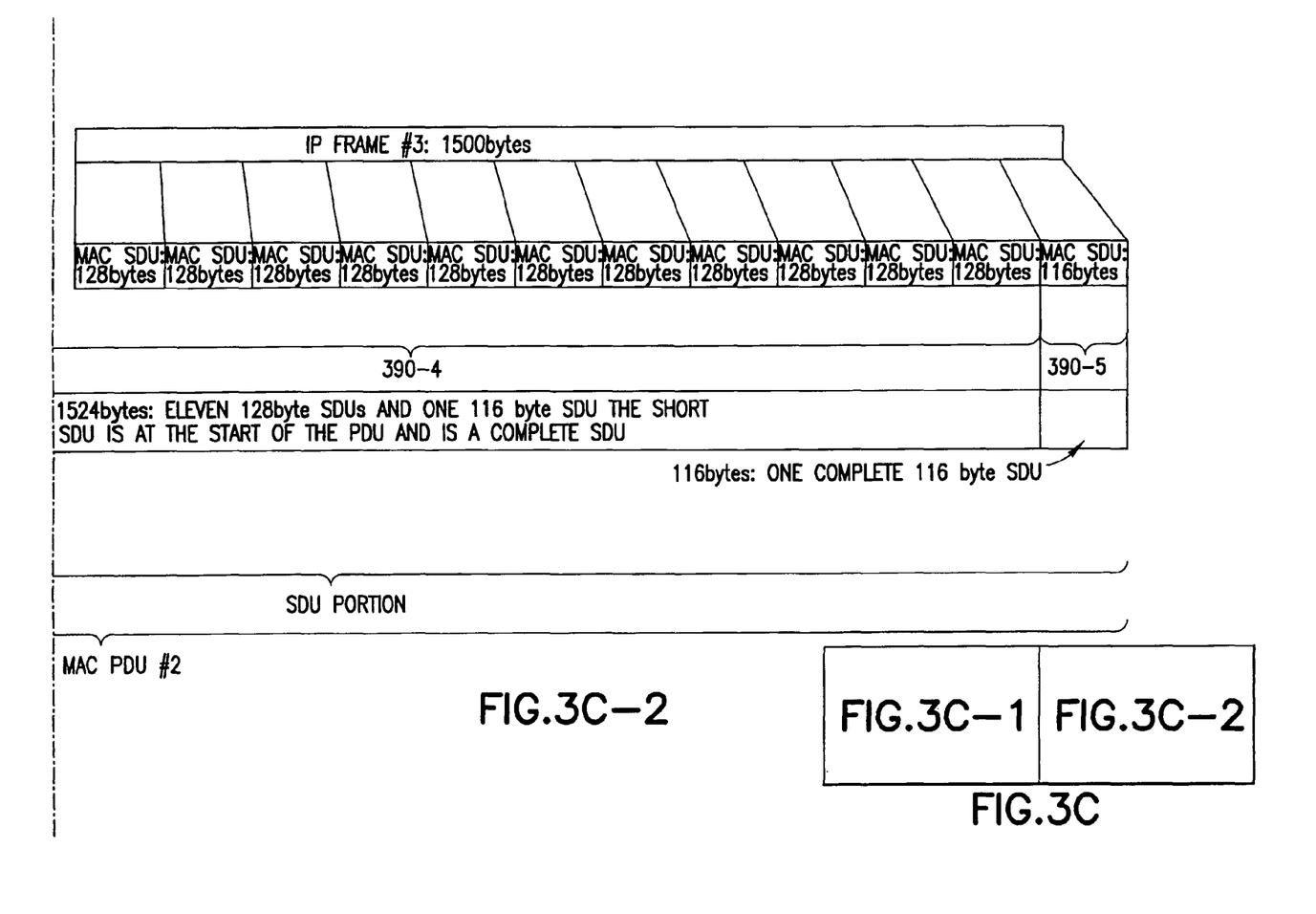

FIG. 3, including FIGS. 3A, 3B, and 3C, is a diagram illustrating one example of MAC PDUs, how MAC SDUs are segmented into portions placed into the MAC PDUs, and how the portions of the MAC SDUs are indicated. FIGS. 3A and 3B show how all of a first IP frame (IP frame #1) and part of a second IP frame (IP frame #2) are formed into a first MAC PDU (MAC PDU #1). FIG. 3C shows how part of the second IP frame (IP frame #2) and all of a third IP frame (IP frame #3) are formed into a second MAC PDU (MAC PDU #2).

In FIGS. 3A and 3B, IP frames #1 and #2 are shown. As shown in FIG. 2, IP frames (e.g., from a PDCP layer) are formatted by the RLC layer into MAC SDUs. In this example, the RLC layer adds two bytes (e.g., as a header) to each MAC SDU, which yields 1524 bytes from a 1500 byte IP frame. All of the MAC SDUs corresponding to IP frame #1 and some of the MAC SDUs from IP frame #2 are formed into the MAC PDU #1. The one MAC SDU 350-8 is segmented into two segments 320, 330, and segment 320 is placed into the MAC PDU #1.

The MAC PDU #1 includes a header and an SDU portion having data portions 390-1 and 390-2. The header may include a version flag (VF), some form of Channel Identifier (ChId), a transmission sequence number (TSN), and a number of segmentation indicators (S), short SDU position indicators (P), and length indicators (Length). With regard to the version flag, this is typically zero. See, e.g., section 9.2.2 of 3GPP TS 25.321, v6.9.0, Exhibit A, attached hereto (see also with respect to the TSN). In the exemplary embodiment of FIG. 3, the segmentation indicator (S) has the following possible values: Y, which means that a segmented SDU exists in the Length; or N, meaning that no segmented SDU exists in the Length (but potentially a short SDU may still exist within the Length). The short SDU position indicator (P) has the following possible values: S, which means that a "short" SDU or a segment of an SDU occurs at the beginning of the Length; and E, which means that a "short" SDU or a segment of an SDU occurs at the end of the Length. The position indicator has no meaning when the Length is less than 128 (in this example) such that a complete, short SDU occurs in the Length. A "short" SDU is an SDU that has a length that is less than a predefined length of a typical SDU. In the example of FIG. 3, the short SDUs are SDUs 340-12, 350-12, and 360-12. It is noted that there may be a "long" SDU that has a length that is longer than a predefined length of a typical SDU. Thus, the exemplary embodiments herein can be applied to any atypically sized SDU (i.e., an SDU having a length different from a predefined length, described below as configured SDU size 401).

In the header of the MAC PDU #1, the data portion header 345-1 corresponds to the data portion 390-1, which includes MAC SDUs 340-1 through 340-12. The length of each of the MAC SDUs included in the data portion can be calculated by knowing the configured SDU size (i.e., a predetermined length). Consequently, there are no segmented SDUs (S=N) but there is a short SDU 340-12 in the data portion 390-1, the short SDU 340-12 is at the end (P=E) of the data portion 390-1, and the length of the data portion 390-1 is 1524 bytes. The data portion header 345-2 corresponds to the data portion 390-2, which includes MAC SDUs 350-1 through 350-7 and segment 320 of SDU 350-8. The length of each of the MAC SDUs included in the data portion can be calculated by knowing the configured SDU size (see configured SDU size 401 of FIG. 4). Consequently, there is a segmented SDU 320 (S=Y) in the data portion 390-2, the SDU segment 320 occurs at the end (P=E) of the data portion 390-2, and the length of the data portion 390-2 is 1002 bytes. Note that both the length and position of each SDU segment can be determined within each data portion.

In terms of FIGS. 3B and 3C, a second MAC PDU #2 has a header and an SDU portion having data portions 390-3, 390-4, and 390-5. The SDU portion is formed using a portion of the MAC SDUs corresponding to IP frame #2 and all of the MAC SDUs corresponding to the IP frame #3. In the header of the MAC PDU #2, the data portion header 345-3 corresponds to the data portion 390-3, which includes the segment 330 of MAC SDU 350-8 and MAC SDUs 350-9 through 350-11. Consequently, there is one SDU segment 330 (S=Y) at the beginning (P=S) of data portion 390-3, and the length of the data portion 390-3 is 406 bytes. The data portion header 345-4 corresponds to the data portion 390-4, which includes the MAC SDU 350-12 and MAC SDUs 360-1 through 360-11. There is no SDU segment (S=N) in data portion 390-4, but there is a short SDU 350-12, which occurs at the beginning (P=S) of the data portion 390-4, and the length of the data portion 390-4 is 1524 bytes. The data portion header 345-5 corresponds to the data portion 390-5, which includes the MAC SDU 360-12. There is no SDU segment (S=N), although there is a short SDU. The short SDU is the only information (the Length of 116 is less than 128 bytes). The P is therefore immaterial.

In the exemplary techniques shown with respect to FIG. 3, there can only be one short SDU or one SDU segment per data portion header 345 and corresponding data portion 390. This is why the MAC SDU 350-12 is placed into data portion 390-4, instead of being placed into data portion 390-3.

It is noted that a predefined length can be used for calculating a length of each of a plurality of input data units included in a data portion of an output data unit, e.g., by using the relationship Length DIV predefinedLength, where DIV indicates division. Similarly, a predefined length can be used for calculating a length of one input data unit that is shorter than the predefined length included within a data portion of an output data unit, e.g. by using the relationship Length MOD predefinedLength, where MOD is the well known modulus operator that is used to divide two numbers and return only the remainder.

The MAC layer is responsible for forming MAC PDUs from MAC SDUs and also for forming MAC SDUs from MAC PDUs. The MAC layer can take the following into account.

1) If the normal SDU size is already known (e.g., via earlier configuration), then a number of SDUs may be indicated with the use of a single length indicator by dividing the length indicator by the standard SDU size.

2) If, after division, there is a remainder, then it can be implied that there is a short SDU present, which is either a complete SDU or a segment of an SDU within the PDU, and the length of the complete SDU or segment can be calculated.

3) Indications (such as the segmentation indicator S and short SDU position indicator P) can be used to define whether this short section is a segmented SDU or a complete SDU, the position of the SDU within the PDU (start or end of the PDU), and the type of segmentation (beginning or end of an SDU).

4) Not all of this information necessarily needs to be indicated, as some may be implied. For example, if the position of the SDU within the PDU, and the segmentation are indicated, then the segmentation type can be implied. If the segmentation type of the SDU is indicated, then the position within the PDU can be implied.

Figures 6, 7:
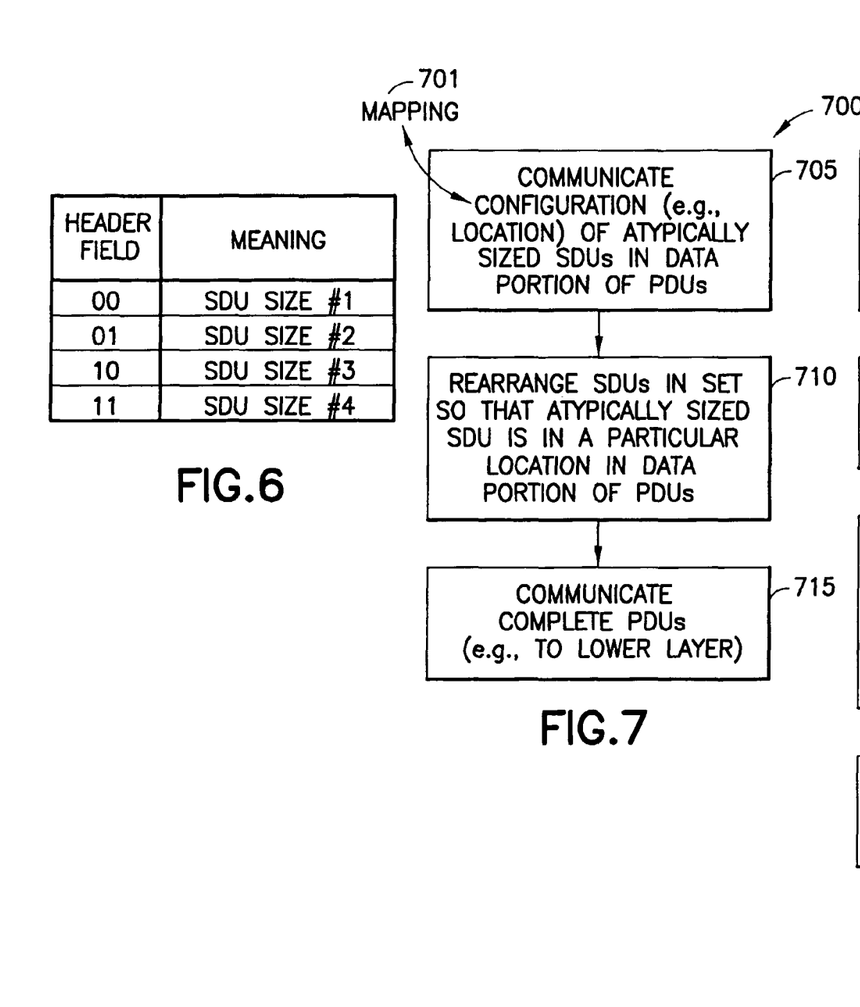
FIG. 6 is a table of an exemplary header field used to indicate a number of predefined SDU sizes used for calculating a length of each of the MAC SDUs included in a data portion of a MAC PDU.
FIG. 7 is a flowchart of an exemplary method for transmission using a flexible data unit arrangement.

5) If several typical SDU sizes are known by the receiver (e.g. via earlier configuration), then a typical SDU size identifier may be used so that the calculations above can be performed. This indication could be done either by a special identifier field, or by some reserved values of other fields in the header. For instance, as shown in FIG. 6, a header field could be added to the header of a MAC PDU in order to indicate one of four possible predefined (e.g., configured) SDU sizes, SDU size #1 through SDU size #4. FIG. 6 is merely one non-limiting example. It is also noted that the header field shown in FIG. 6, instead of being placed into a header of a PDU, could be signaled in advance.

6) If a short SDU exists within a range of normal sized SDUs, then depending on the properties of the layer above, it may be possible to include the short SDU out-of-order, in which case it can be useful to always send the short SDU at, e.g., the end (or the beginning) of a PDU. In this way, it may be possible to reduce the number of indications and length indicators necessary. See FIGS. 7 and 8 for examples of this.

7) If an SDU is not of the normal configured size (e.g., as indicated by a configured SDU size 401, discussed below), or some segmentation is needed that not does follow the rules above, then an indication may be used to show that this SDU is a single variable length SDU, and that a length indicator is included to specify the length of the SDU. This indication could be implicit by the length indicated (e.g., smaller than the normal configured size).

Figure 4:
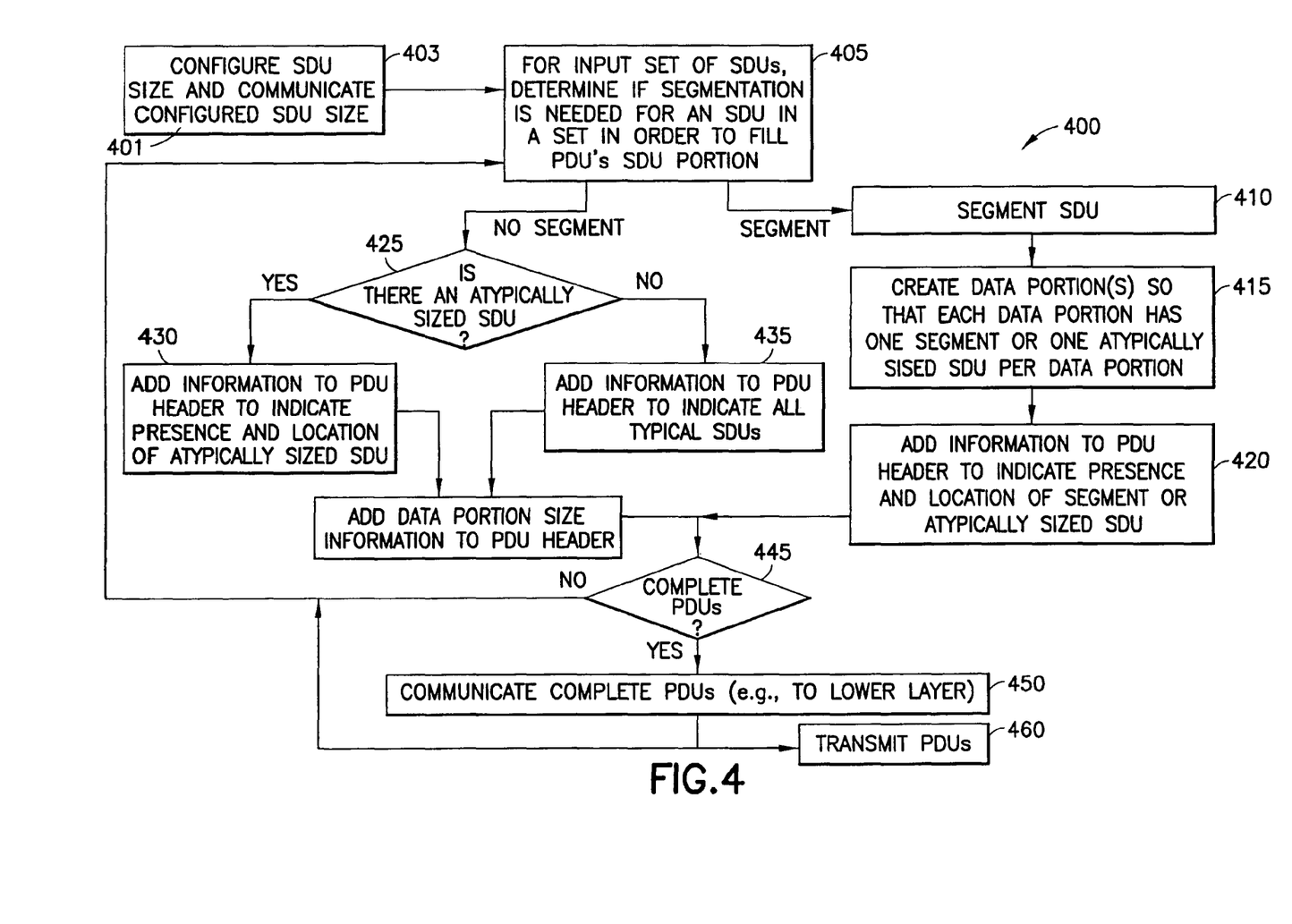
FIG. 4 is a flowchart of an exemplary method for transmission using flexible data unit segmentation.

Turning to FIG. 4 (with appropriate reference to previous figures), a flowchart is shown of an exemplary method 400 for transmission using flexible data unit segmentation. Method 400 might be performed, e.g., by a MAC layer (e.g., module) in the UE 10 in the uplink (UL) or by a MAC layer (e.g., module) in the base station 12 in the downlink (DL). In block 403, a "typical" SDU size is configured as configured SDU size 401. The configured SDU size 401 is used, as described above, to calculate the length of each of the MAC SDUs included in data portions. The configured SDU size 401 can be communicated (e.g., transmitted or received). For instance, a base station 12 may determine the configured SDU size 401 and transmit the configured SDU size 401 to the UE 10. The base station 12 then performs method 400 using the configured SDU size 401 to transmit PDUs to the UE 10, and the UE 10 would perform method 500 of FIG. 5 using the configured SDU size 401 in order to receive the PDUs.

In block 405, for some input set (e.g., SDUs 340, 350, 360) of SDUs, it is determined if segmentation is necessary for an SDU in the set in order to fill the SDU portion of the PDU.

If no segmentation is needed (No Segment), method 400 moves to block 425. In block 425, it is determined if there is an atypically sized SDU. Such a determination is made through, e.g., a comparison of the length of the SDUs in the input set with the configured SDU size 401. Any deviation from the configured SDU size 401 indicates an atypically sized SDU. If so (block 425=YES), information is added to the PDU header to indicate the presence and location (e.g., end, E, or start, S) of the atypically sized PDU. This occurs in block 430. If not (block 425=NO), then information is added to the PDU header to indicate that all SDUs are the typical, predefined size (block 435). In block 440, the size (i.e., length) information for the data portion is added to the PDU header.

After block 405, if an SDU is to be segmented (Segment), the method 400 moves to block 410, where the SDU is segmented. In block 415 in an exemplary embodiment, data portion(s) are created so that each data portion has either one segment or one atypically sized SDU per data portion. In block 420, information is added to the PDU header to indicate presence and location (e.g., end or beginning) of segment or atypically sized SDU within the data portion.

In block 445, it is determined if there are complete (e.g., filled) PDUs. If so (block 445=YES), the PDUs are communicated (block 450), e.g., to lower layers such as the PHY layer. The PHY layer would then cause the PDUs to be transmitted (e.g., from the UE 10 to the base station 12 or vice versa) in block 460. If there are no completed PDUs (block 445=NO), or once the completed PDUs have been communicated (block 450), the method 400 continues again in block 405.

Figure 5:
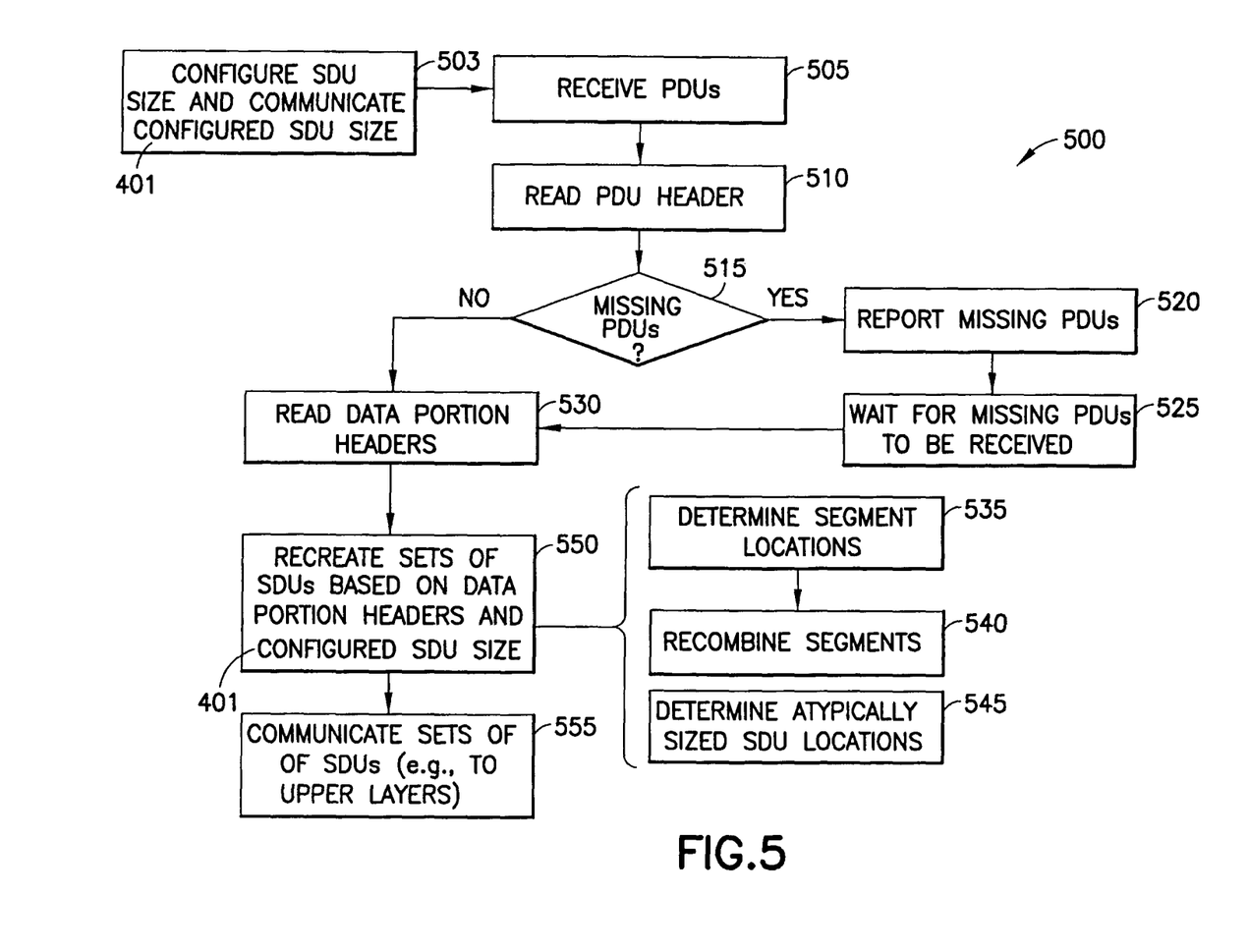
FIG. 5 is a flowchart of an exemplary method for reception using flexible data unit segmentation.

Referring now to FIG. 5 (with appropriate reference to previous figures), a flowchart is shown of an exemplary method 500 for reception using flexible data unit segmentation. Method 500 might be performed, e.g., by a MAC layer (e.g., module) in the UE 10 in the downlink (DL) or by a MAC layer (e.g., module) in the base station 12 in the uplink (UL). Method 500 begins in block 503, when an SDU size is configured as configured SDU size 401. The configured SDU size 401 may be communicated (e.g., transmitted or received). In a non-limiting embodiment, the entity (e.g., base station 12 or UE 10) performing method 400 to transmit the PDUs would set the configured SDU size 401. Therefore, the entity performing method 500 would simply receive an indication of the configured SDU size 401 and then use the indication to use configure the SDU size as configured SDU size 401.

In block 505, PDUs are received (e.g., from lower layers such as the PHY layer, which has received information including the PDUs from a wireless link and using one or more antennas). The PDU header(s) are read (block 510). In block 515, it is determined if there are missing PDUs, e.g., by using the transmission sequence number. If so (block 515=YES), the missing PDUs are reported (block 520), e.g., using negative acknowledgement (NACK) or other techniques. In block 525, a wait occurs for the missing PDUs.

If there are no missing PDUs (block 515=NO) or the missing PDUs are received after waiting, the data portion headers are read in block 530. In block 550, information from the previous blocks is used to recreate the sets of SDUs. Block 550 is performed, e.g., using blocks 535, 540, and 545. In block 535, the segment locations, if any, and lengths are determined from the data portion headers. The segments (if any) are recombined in block 540. In block 545, any locations of atypically sized SDUs are determined. In block 555, the sets of SDUs are communicated, e.g., to upper layers such as an RLC layer and then to an application, such as an Internet or voice-over-IP application.

Referring now to FIG. 7, a flowchart is shown of an exemplary method 700 for transmission using a flexible data unit arrangement. In this example, in block 705, configuration is communicated corresponding to atypically sized SDUs in data portions of the PDUs. Such configuration includes location (e.g., end or beginning of the data portion) and may include configured SDU size (see FIG. 6) and mapping 701 from a source SDU in a set of SDUs to the location in the PDU. For instance, an atypically sized SDU at original location X in a set of SDUs might be placed into a beginning of a data portion of a PDU, and the mapping 701 could indicate this arrangement. Such communication could be signaled in advance or could be included in a header of a PDU.

In block 710, the SDUs are arranged so that the atypically sized SDU is placed in the configured location. It is noted that the arrangement in block 710 may be performed by the MAC layer or higher layers (e.g., the RLC layer). It is further noted that the header of the PDU may or may not contain information such as the segmentation indicator or the short SDU position indicator described above. For instance, if no segmentation is to be performed and the location of the short SDU is known, then nothing need be added to the header of the PDU. However, if segmentation is to be performed, then an indication with regard to at least the segmentation should be made in the header of the PDU.

In block 715, the complete PDUs are communicated, e.g., to a lower layer, which then transmits information including the complete PDUs. It is noted that methods 700 and 400 may be combined, e.g., so that when there is an atypically sized PDU, it is always in a particular location.

Figure 8:
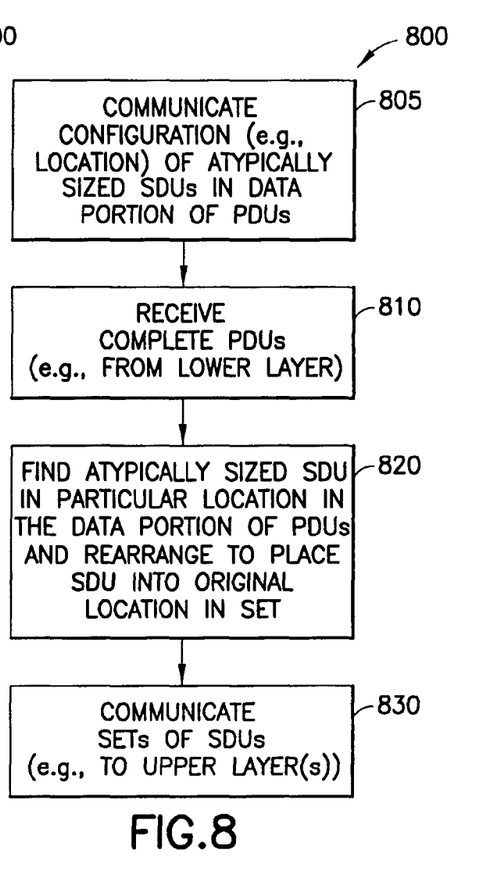
FIG. 8 is a flowchart of an exemplary method for reception using a flexible data unit arrangement.

FIG. 8 is a flowchart of an exemplary method for reception using a flexible data unit arrangement. In method 800, configuration is communicated in block 805 corresponding to atypically sized SDUs in data portions of the PDUs. In block 810, complete PDUs are received, e.g., from a lower layer. In block 820, using the configuration, the location of the atypically sized SDU is determined, the SDU is retrieved, and the retrieved SDU is placed back into its original location in a set of SDUs. In block 830, the sets of SDUs are communicated, e.g., to upper layers. It is noted that methods 500 of FIG. 5 and 800 of FIG. 8 can be combined, if desired.

It is noted that FIGS. 4-7 are merely examples of potential methods for transmission and reception. Other methods, e.g., as indicated by 1) through 7) above, are possible.

Although the examples above relate to base stations and controllers, these are merely examples and the techniques presented can be applied to other items such as access points and other identities. Furthermore, although a header for the MAC PDU is disclosed, information could be placed instead into a footer or elsewhere outside of the SDU segments or the atypically sized SDUs.

In an exemplary embodiment, a method is disclosed that includes determining if a particular one of a set of input data units is to be segmented in order to fit a portion of the set, including a segment of the particular input data unit, into an output data unit, segmenting the input data unit in response to determining the particular input data unit is to be segmented, adding the portion of the set to a data portion of the output data unit, and adding into the output data unit an indication of a position of the segment in the data portion. In another exemplary embodiment, the position is either at a beginning of the data portion or at an end of the data portion. In a further exemplary embodiment, an indication of a length of the segment is added to the output data unit. In a further exemplary embodiment, the indications of the position and the length are placed in a data portion header that corresponds to the data portion and that resides in a header of the output data unit. In another exemplary embodiment, the output data units are communicated, e.g., to lower layers for transmission.

In an additional exemplary embodiment, an apparatus includes at least one processor configured to determine if a particular one of a set of input data units is to be segmented in order to fit a portion of the set, including a segment of the particular input data unit, into an output data unit, the at least one processor further configured to segment the input data unit in response to determining the particular input data unit is to be segmented, and configured to add the portion of the set to a data portion of the output data unit, and the at least one processor configured to add into the output data unit an indication of a position of the segment in the data portion. In a further exemplary embodiment, the at least one processor is formed at least in part on an integrated circuit. In another exemplary embodiment, the apparatus includes a transceiver configured to transmit information including the output data unit.

In another exemplary embodiment, a method is disclosed that includes creating, from a set of input data units, data portions that contain either one segment of a data unit or one atypically sized data unit, where the atypically sized data unit has a length that is different from a predetermined length, creating complete output data units from the data portions, and providing indications in the output data units as to which one of a segment or an atypically sized data unit is contained within associated ones of the data portions. In a further exemplary embodiment, creating further includes creating, from the set of input data units, data portions that contain either one segment of a data unit or one atypically sized data unit at either a beginning or an end of the data portions. In an additional exemplary embodiment, the method further includes creating at least one data portion that does not contain either one segment of a data unit or one atypically sized data unit. In yet another exemplary embodiment, the method includes configuring the predetermined length and communicating the predetermined length.

In an additional exemplary embodiment, an apparatus is disclosed that includes at least one processor configured to create, from a set of input data units, data portions that contain either one segment of a data unit or one atypically sized data unit, where the atypically sized data unit has a length that is different from a predetermined length, the at least one processor further configured to create complete output data units from the data portions, and configured to provide indications in the output data units as to which one of a segment or an atypically sized data unit is contained within associated ones of the data portions. In a further exemplary embodiment, the at least one processor is formed at least in part on an integrated circuit. In another exemplary embodiment, the apparatus includes a transceiver configured to transmit information including the output data units.

In another exemplary embodiment, a method is disclosed that includes receiving first data units, each of the first data units including a plurality of data portions having a plurality of second data units, each of at least two of the first data units including an indication of a position of a segment of a second data unit in associated ones of the data portions, combining using at least the indications the segments to create a complete second data unit, and outputting the complete second data unit. In another exemplary embodiment, a predetermined length for the second data units is used to perform combining.

In an additional exemplary embodiment, an apparatus is disclosed that includes at least one processor configured to receive first data units, each of the first data units including a plurality of data portions having a plurality of second data units, each of at least two of the first data units including an indication of a position of a segment of a second data unit in associated ones of the data portions, the at least one processor further configured to combine using at least the indications the segments to create a complete second data unit, and configured to output the complete second data unit. In another exemplary embodiment, the at least one processor is implemented on at least one integrated circuit. In another exemplary embodiment, the apparatus further includes a transceiver configured to receive information including the first data units.

In a further exemplary embodiment, a method is disclosed including receiving first data units including data portions and indications as to which one of a segment of a second data unit or an atypically sized second data unit is contained within associated ones of the data portions, the data portions including a plurality of second data units, where the atypically sized second data unit has a length that is different from a predetermined length, and determining, based at least in part on the indications, the predetermined length, and the data portions, output data units that correspond to the second data units. In another exemplary embodiment, the predetermined length for the second data units is received.

In a further exemplary embodiment, an apparatus is disclosed that includes at least one processor configured to receive first data units including data portions and indications as to which one of a segment of a second data unit or an atypically sized second data unit is contained within associated ones of the data portions, the data portions including a plurality of second data units, where the atypically sized second data unit has a length that is different from a predetermined length, and the at least one processor is further configured to determine, based at least in part on the indications, the predetermined length, and the data portions, output data units that correspond to the second data units.

In another exemplary embodiment, a method is disclosed that includes determining a location of a particular one of a set of input data units, the set of input data units having an original order, placing the particular input data unit and a plurality of data units from the set in an output data unit, wherein the placing occurs so that the particular input data unit is placed in a particular location of the output data unit and is placed out-of-order relative to the original order, and communicating the output data unit. In a further exemplary embodiment, determining the location and placing the particular input data unit in a particular location are performed using a configuration. An indication of the configuration could be signaled in advance or be placed into a header of the output data unit.

In another exemplary embodiment, a method is disclosed that includes receiving a first data unit including a plurality of second data units, wherein a particular one of the plurality of second data units is situated at a predetermined location in the first data unit, wherein the plurality of second data units had an original order and the predetermined location of the particular second data unit places the particular second data unit out-of-order relative to the original order, extracting the plurality of second data units, rearranging the particular second data unit and the others of the plurality of second data units into the original order, and communicating the rearranged plurality of second data units. In a further exemplary embodiment, the particular location and the original order are determined using a configuration.

Any of the methods and apparatus above can also include communicating an indication of which of a number of predefined lengths are to be used for calculating a length of each of a plurality of input data units included in a data portion of an output data unit. Such an indication can be included in a header of an output data unit, for instance.

As described above, exemplary embodiments herein can be implemented as a computer program product tangibly embodying a program of machine-readable instructions, which are executable by at least one data processor to perform operations described herein (e.g., in the methods described above).

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method comprising:
generating an output data unit including one or more first typical input data units having a predetermined length and one atypical second input data unit having a length different from the predetermined length;
generating a header for the output data unit, wherein the header comprises only one length indicator serving both the one or more first typical input data units and the one atypical second input data unit, wherein the only one length indicator is utilized to calculate the number of first typical input data units and the actual length of the atypical second input data units; and
transmitting, via a transmitter, the output data unit and the header to a receiver.

2. The method of claim 1, further comprising:
segmenting the one or more first typical input data units into a plurality of portions; and
adding only a subset of the plurality of portions into the output data unit.

3. The method of claim 1, wherein the one or more first typical input data units comprise service data units and wherein the output data unit comprises a protocol data unit.

4. The method of claim 1, wherein the one atypical second input data unit is a segmented portion of a typical input data unit.

5. The method of claim 1, wherein the one atypical second input data unit is located at one of a beginning of the output data unit and an end of the output data unit.

6. An apparatus comprising:
at least one processor configured for:
generating an output data unit including one or more first typical input data units having a predetermined length and one atypical second input data unit having a length different from the predetermined length;
generating a header for the output data unit, wherein the header comprises only one length indicator serving both the one or more first typical input data units and the one atypical second input data unit, wherein the only one length indicator is utilized to calculate the number of first typical input data units and the actual length of the atypical second input data units; and
transmitting, via a transmitter, the output data unit and the header to a receiver.

7. The apparatus of claim 6, wherein the processor is further configured for:
segmenting the one or more first typical input data units into a plurality of portions; and
adding only a subset of the plurality of portions into the output data unit.

8. The apparatus of claim 6, wherein the one or more first typical input data units comprise service data units and wherein the output data unit comprises a protocol data unit.

9. The apparatus of claim 6, wherein the one atypical second input data unit is a segmented portion of a typical input data unit.

10. The apparatus of claim 6, wherein the one atypical second input data unit is located at one of a beginning of the output data unit and an end of the output data unit.

* * * * *